(12) United States Patent
Hakola et al.

(10) Patent No.: US 11,979,211 B2
(45) Date of Patent: May 7, 2024

(54) MANAGING MULTIPLE ANTENNA PANELS FOR USER EQUIPMENT WITHIN WIRELESS NETWORKS

(71) Applicant: Nokia Solutions and Networks Oy, Espoo (FI)

(72) Inventors: Sami Hakola, Kempele (FI); Jorma Kaikkonen, Oulu (FI); Timo Koskela, Oulu (FI); Mihai Enescu, Espoo (FI); Juha Karjalainen, Oulu (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 377 days.

(21) Appl. No.: 17/603,844

(22) PCT Filed: May 8, 2020

(86) PCT No.: PCT/IB2020/054389
§ 371 (c)(1),
(2) Date: Oct. 14, 2021

(87) PCT Pub. No.: WO2020/229976
PCT Pub. Date: Nov. 19, 2020

(65) Prior Publication Data
US 2022/0239352 A1    Jul. 28, 2022

Related U.S. Application Data

(60) Provisional application No. 62/847,925, filed on May 14, 2019.

(51) Int. Cl.
*H04B 7/06* (2006.01)
*H04L 5/00* (2006.01)
*H04W 72/23* (2023.01)

(52) U.S. Cl.
CPC .......... *H04B 7/061* (2013.01); *H04B 7/0626* (2013.01); *H04B 7/0695* (2013.01); *H04L 5/0048* (2013.01); *H04W 72/23* (2023.01)

(58) Field of Classification Search
CPC .... H04B 7/061; H04B 7/0626; H04B 7/0695; H04B 7/0805; H04B 7/088; H04B 7/0404;
(Continued)

(56) References Cited

U.S. PATENT DOCUMENTS 10,742,295 B2 * 8/2020 Raghavan ............ H04B 7/0639
2012/0250149 A1   10/2012 Karaki et al.
2018/0310193 A1   10/2018 Bhorkar et al.

FOREIGN PATENT DOCUMENTS

CN    109076371 A   12/2018
EP    1744467 A1    1/2007
(Continued)

OTHER PUBLICATIONS

"3rd Generation Partnership Project; Technical Specification Group Radio Access Network; NR; User Equipment (UE) radio access capabilities (Release 15)", 3GPP TS 38.306, V15.5.0, Mar. 2019, pp. 1-49.
(Continued)

*Primary Examiner* — Kyaw Z Soe
(74) *Attorney, Agent, or Firm* — Robert P. Michal, Esq.; Carter, DeLuca & Farrell LLP

(57) ABSTRACT

A method may include sending, by a user equipment that includes a plurality of antenna panels, to a base station, timing information including at least one of a beam switch timing or a beam report timing, wherein the timing information includes timing information provided for at least one of a first mode of operation or a second mode of operation, wherein the first mode of operation comprising the user
(Continued)

Example Wireless Network 130 equipment not performing switching between an active antenna panel and an inactive antenna panel, and the second mode of operation comprising the user equipment performing switching between an active antenna panel and an inactive panel; and receiving, by the user equipment, at least one downlink control information indicating a mode of operation for the user equipment, wherein the indicated mode of operation is at least one of the first mode of operation or the second mode of operation.

20 Claims, 6 Drawing Sheets

(58) Field of Classification Search
CPC ... H04L 5/0048; H04L 5/0023; H04L 5/0078; H04L 5/0091; H04W 72/23
See application file for complete search history.

(56) References Cited

FOREIGN PATENT DOCUMENTS

| WO | 2018/126361 A1 | 7/2018 |
|---|---|---|
| WO | 2019/212682 A1 | 11/2019 |

OTHER PUBLICATIONS

"3rd Generation Partnership Project; Technical Specification Group Radio Access Network; NR; Physical layer procedures for data (Release 15)", 3GPP TS 38.214, V15.5.0, Mar. 2019, pp. 1-103.

"3rd Generation Partnership Project; Technical Specification Group Radio Access Network; Study on New Radio (NR) access technology (Release 15)", 3GPP TR 38.912, V15.0.0, Jun. 2018, pp. 1-74.

"3rd Generation Partnership Project; Technical Specification Group Radio Access Network; Evolved Universal Terrestrial Radio Access (E-UTRA); User Equipment (UE) radio access capabilities (Release 15)", 3GPP TS 36.306, V15.4.0, Mar. 2019, pp. 1-119.

International Search Report and Written Opinion received for corresponding Patent Cooperation Treaty Application No. PCT/IB2020/054389, dated Aug. 3, 2020, 15 pages.

"Support of power efficient panel switch UE feature", 3GPP TSG RAN Meeting 80, RP-180678, Agenda: 9.8, Qualcomm Incorporated, Jun. 11-14, 2018, pp. 1-3.

"UE Adaptation to the Traffic and UE Power Consumption Characteristics", 3GPP TSG-RAN WG1 Meeting #95, R1-1813447, Agenda: 7.2.9.2.1, Qualcomm Incorporated, Nov. 12-16, 2018, pp. 1-20.

Office action received for corresponding Chinese Patent Application No. 202080035890.3, dated Jun. 7, 2023, 11 pages of office action and no page of translation available.

Office Action issued by the China National Intellectual Property Administration in relation to Chinese Patent Application No. 202080035890.3, dated Nov. 22, 2023, (9 pages), no English translation available.

* cited by examiner

MANAGING MULTIPLE ANTENNA PANELS FOR USER EQUIPMENT WITHIN WIRELESS NETWORKS

RELATED APPLICATION

This application claims priority to PCT Application No. PCT/IB2020/054389, filed on May 8, 2020, which claims priority to U.S. Application No. 62/847,925, filed on May 14, 2019, each of which is incorporated herein by reference in its entirety.

TECHNICAL FIELD

This description relates to wireless communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments. Aspects of LTE are also continuing to improve.

5G New Radio (NR) development is part of a continued mobile broadband evolution process to meet the requirements of 5G, similar to earlier evolution of 3G & 4G wireless networks. In addition, 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT) and may offer new types of mission-critical services. For example, ultra-reliable and low-latency communications (URLLC) devices may require high reliability and very low latency.

SUMMARY

According to an example embodiment, a method may include: sending, by a user equipment that includes a plurality of antenna panels, to a base station, timing information including at least one of a beam switch timing or a beam report timing, wherein the timing information includes timing information provided for at least one of a first mode of operation or a second mode of operation, wherein the first mode of operation comprising the user equipment not performing switching between an active antenna panel and an inactive antenna panel of the plurality of antenna panels, and the second mode of operation comprising the user equipment performing switching between an active antenna panel and an inactive panel of the plurality of antenna panels; and receiving, by the user equipment from the base station, at least one downlink control information indicating a mode of operation for the user equipment, wherein the indicated mode of operation is at least one of the first mode of operation or the second mode of operation.

According to an example embodiment, an apparatus may include means for sending, by a user equipment that includes a plurality of antenna panels, to a base station, timing information including at least one of a beam switch timing or a beam report timing, wherein the timing information includes timing information provided for at least one of a first mode of operation or a second mode of operation, wherein the first mode of operation comprising the user equipment not performing switching between an active antenna panel and an inactive antenna panel of the plurality of antenna panels, and the second mode of operation comprising the user equipment performing switching between an active antenna panel and an inactive panel of the plurality of antenna panels; and means for receiving, by the user equipment from the base station, at least one downlink control information indicating a mode of operation for the user equipment, wherein the indicated mode of operation is at least one of the first mode of operation or the second mode of operation.

According to an example embodiment, an apparatus may include: at least one processor; and at least one memory including computer program code; the at least one memory and the computer program code configured to, with the at least one processor, cause the apparatus at least to: send, from a user equipment, to a base station, timing information including at least one of a beam switch timing or a beam report timing, wherein the timing information includes timing information provided for at least one of a first mode of operation or a second mode of operation, wherein the first mode of operation comprising the apparatus not performing switching between an active antenna panel and an inactive antenna panel of a plurality of antenna panels, and the second mode of operation comprising the apparatus performing switching between an active antenna panel and an inactive panel of the plurality of antenna panels; and receive, at the user equipment from the base station, at least one downlink control information indicating a mode of operation for the apparatus, wherein the indicated mode of operation is at least one of the first mode of operation or the second mode of operation.

According to an example embodiment, a non-transitory computer-readable storage medium comprising instructions stored thereon that, when executed by at least one processor, are configured to cause a computing system to perform a method of: sending, by a user equipment that includes a plurality of antenna panels, to a base station, timing information including at least one of a beam switch timing or a beam report timing, wherein the timing information includes timing information provided for at least one of a first mode of operation or a second mode of operation, wherein the first mode of operation comprising the user equipment not performing switching between an active antenna panel and an inactive antenna panel of the plurality of antenna panels, and the second mode of operation comprising the user equipment performing switching between an active antenna panel and an inactive panel of the plurality of antenna panels; and receiving, by the user equipment from the base station, at least one downlink control information indicating a mode of operation for the user equipment, wherein the indicated mode of operation is at least one of the first mode of operation or the second mode of operation.

According to an example embodiment, a method may include: receiving, by a base station from a user equipment that includes a plurality of antenna panels, timing information including at least one of a beam switch timing or a beam report timing, wherein the timing information includes timing information provided for at least one of a first mode of operation or a second mode of operation, wherein the first mode of operation comprising no switching between an active antenna panel and an inactive antenna panel of the plurality of antenna panels at the user equipment, and the second mode of operation comprising switching between an active antenna panel and an inactive panel of the plurality of antenna panels at the user equipment; selecting a mode of operation for the user equipment as either the first mode of operation or the second mode of operation; and sending, by the base station to the user equipment, at least one downlink control information indicating the selected mode of operation for the user equipment.

According to an example embodiment, an apparatus may include means for receiving, by a base station from a user equipment that includes a plurality of antenna panels, timing information including at least one of a beam switch timing or a beam report timing, wherein the timing information includes timing information provided for at least one of a first mode of operation or a second mode of operation, wherein the first mode of operation comprising no switching between an active antenna panel and an inactive antenna panel of the plurality of antenna panels at the user equipment, and the second mode of operation comprising switching between an active antenna panel and an inactive panel of the plurality of antenna panels at the user equipment; means for selecting a mode of operation for the user equipment as either the first mode of operation or the second mode of operation; and means for sending, by the base station to the user equipment, at least one downlink control information indicating the selected mode of operation for the user equipment.

According to an example embodiment, an apparatus may include: at least one processor; and at least one memory including computer program code; the at least one memory and the computer program code configured to, with the at least one processor, cause the apparatus at least to: receive, by a base station from a user equipment that includes a plurality of antenna panels, timing information including at least one of a beam switch timing or a beam report timing, wherein the timing information includes timing information provided for at least one of a first mode of operation or a second mode of operation, wherein the first mode of operation comprising no switching between an active antenna panel and an inactive antenna panel of the plurality of antenna panels at the user equipment, and the second mode of operation comprising switching between an active antenna panel and an inactive panel of the plurality of antenna panels at the user equipment; select a mode of operation for the user equipment as either the first mode of operation or the second mode of operation; and send, by the base station to the user equipment, at least one downlink control information indicating the selected mode of operation for the user equipment.

According to an example embodiment, a non-transitory computer-readable storage medium comprising instructions stored thereon that, when executed by at least one processor, are configured to cause a computing system to perform a method of: receiving, by a base station from a user equipment that includes a plurality of antenna panels, timing information including at least one of a beam switch timing or a beam report timing, wherein the timing information includes timing information provided for at least one of a first mode of operation or a second mode of operation, wherein the first mode of operation comprising no switching between an active antenna panel and an inactive antenna panel of the plurality of antenna panels at the user equipment, and the second mode of operation comprising switching between an active antenna panel and an inactive panel of the plurality of antenna panels at the user equipment; selecting a mode of operation for the user equipment as either the first mode of operation or the second mode of operation; and sending, by the base station to the user equipment, at least one downlink control information indicating the selected mode of operation for the user equipment.

The details of one or more examples of embodiments are set forth in the accompanying drawings and the description below. Other features will be apparent from the description and drawings, and from the claims.

DETAILED DESCRIPTION

Figure 1:
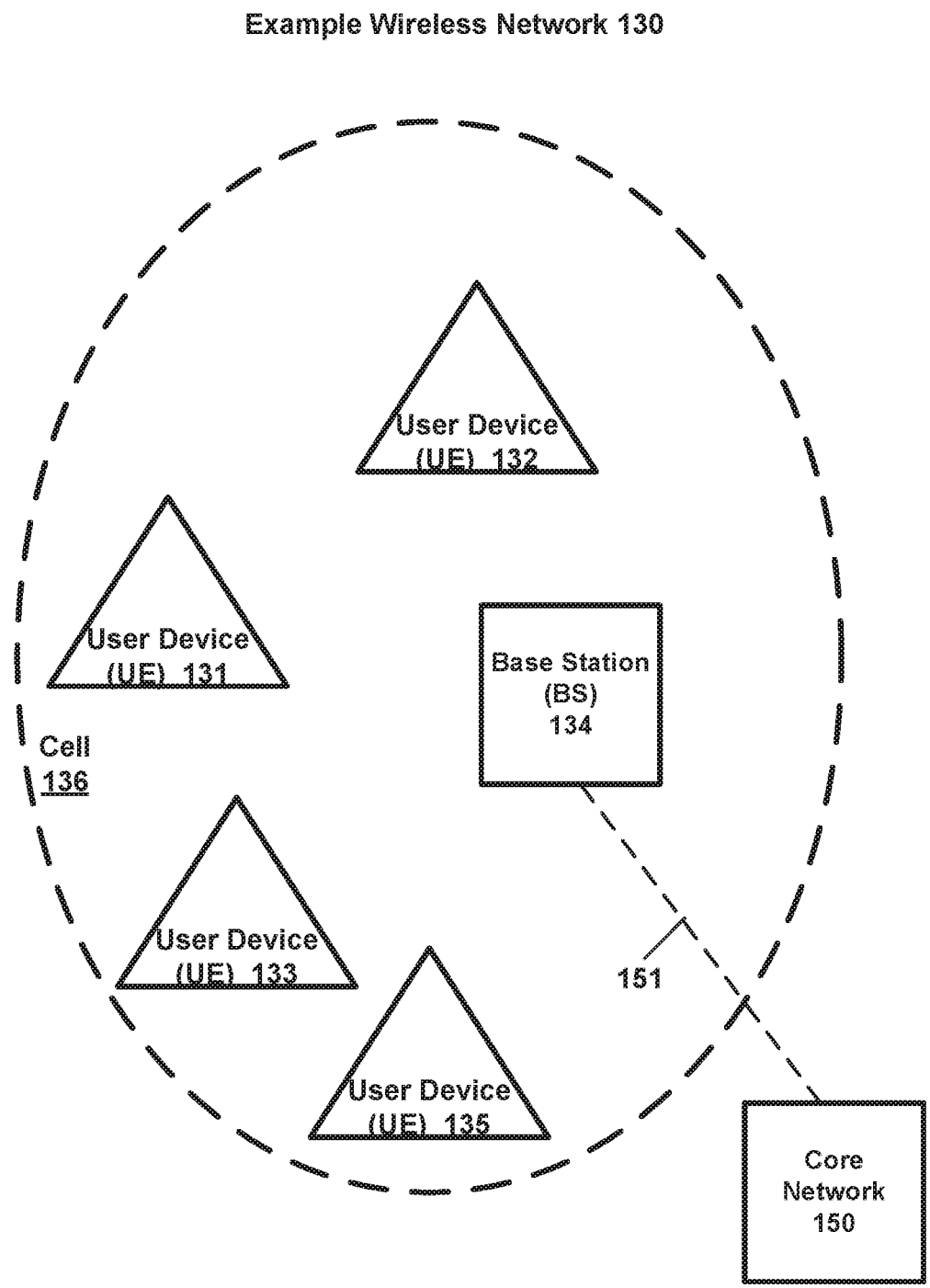
FIG. 1 is a block diagram of a wireless network according to an example embodiment.

FIG. 1 is a block diagram of a wireless network 130 according to an example embodiment. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a gNB or a network node. The terms user device and user equipment (UE) may be used interchangeably. A BS may also include or may be referred to as a RAN (radio access network) node, and may include a portion of a BS or a portion of a RAN node, such as (e.g., such as a centralized unit (CU) and/or a distributed unit (DU) in the case of a split BS or split gNB). At least part of the functionalities of a BS (e.g., access point (AP), base station (BS) or (e)Node B (eNB), gNB, RAN node) may also be carried out by any node, server or host which may be operably coupled to a transceiver, such as a remote radio head. BS (or AP) 134 provides wireless coverage within a cell 136, including to user devices (or UEs) 131, 132, 133 and 135. Although only four user devices (or UEs) are shown as being connected or attached to BS 134, any number of user devices may be provided. BS 134 is also connected to a core network 150 via a S1 interface 151. This is merely one simple example of a wireless network, and others may be used.

A base station (e.g., such as BS 134) is an example of a radio access network (RAN) node within a wireless network. A BS (or a RAN node) may be or may include (or may alternatively be referred to as), e.g., an access point (AP), a gNB, an eNB, or portion thereof (such as a centralized unit (CU) and/or a distributed unit (DU) in the case of a split BS or split gNB), or other network node.

According to an illustrative example, a BS node (e.g., BS, eNB, gNB, CU/DU, . . . ) or a radio access network (RAN) may be part of a mobile telecommunication system. A RAN (radio access network) may include one or more BSs or RAN nodes that implement a radio access technology, e.g., to allow one or more UEs to have access to a network or core network. Thus, for example, the RAN (RAN nodes, such as BSs or gNBs) may reside between one or more user devices or UEs and a core network. According to an example embodiment, each RAN node (e.g., BS, eNB, gNB, CU/DU, . . . ) or BS may provide one or more wireless communication services for one or more UEs or user devices, e.g., to allow the UEs to have wireless access to a network, via the RAN node. Each RAN node or BS may perform or provide wireless communication services, e.g., such as allowing UEs or user devices to establish a wireless connection to the RAN node, and sending data to and/or receiving data from one or more of the UEs. For example, after establishing a connection to a UE, a RAN node (e.g., BS, eNB, gNB, CU/DU, . . . ) may forward data to the UE that is received from a network or the core network, and/or forward data received from the UE to the network or core network. RAN nodes (e.g., BS, eNB, gNB, CU/DU, . . . ) may perform a wide variety of other wireless functions or services, e.g., such as broadcasting control information (e.g., such as system information) to UEs, paging UEs when there is data to be delivered to the UE, assisting in handover of a UE between cells, scheduling of resources for uplink data transmission from the UE(s) and downlink data transmission to UE(s), sending control information to configure one or more UEs, and the like. These are a few examples of one or more functions that a RAN node or BS may perform.

A user device (user terminal, user equipment (UE), mobile terminal, handheld wireless device, etc.) may refer to a portable computing device that includes wireless mobile communication devices operating either with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, a sensor, and a multimedia device, as examples, or any other wireless device. It should be appreciated that a user device may also be (or may include) a nearly exclusive uplink only device, of which an example is a camera or video camera loading images or video clips to a network.

In LTE (as an illustrative example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks. Other types of wireless networks, such as 5G (which may be referred to as New Radio (NR)) may also include a core network.

In addition, by way of illustrative example, the various example embodiments or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC). Many of these new 5G (NR) —related applications may require generally higher performance than previous wireless networks.

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of $10^{-5}$ and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability). Thus, for example, a URLLC UE (or URLLC application on a UE) may require much shorter latency, as compared to a eMBB UE (or an eMBB application running on a UE).

The various example embodiments may be applied to a wide variety of wireless technologies or wireless networks, such as LTE, LTE-A, 5G (New Radio (NR)), cmWave, and/or mmWave band networks, IoT, MTC, eMTC, eMBB, URLLC, etc., or any other wireless network or wireless technology. These example networks, technologies or data service types are provided only as illustrative examples.

Figure 2:
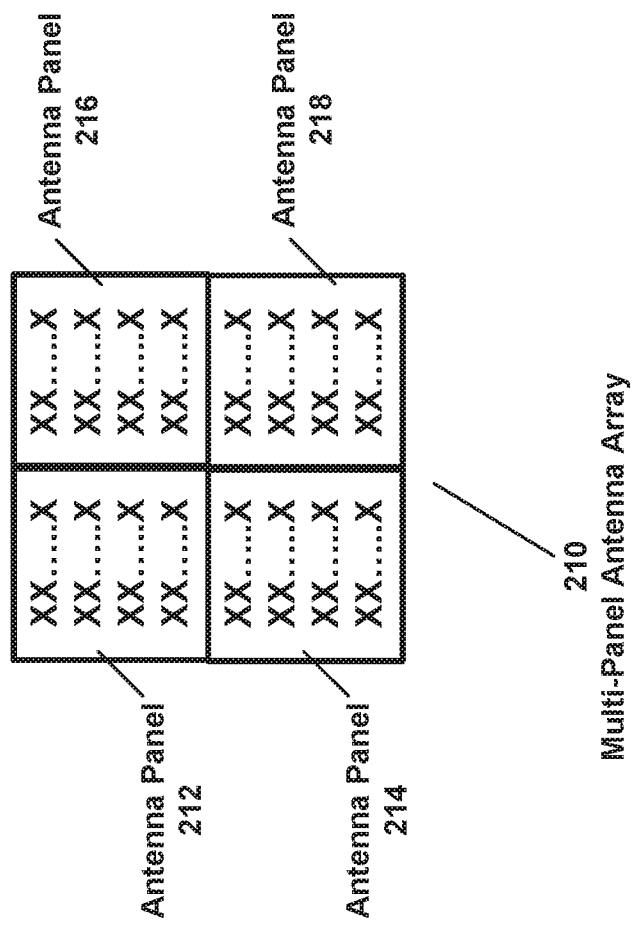
FIG. 2 is a diagram illustrating a multi-panel antenna array according to an example embodiment.

According to an example embodiment, a UE (e.g., user device, or user terminal) and/or a BS (e.g., gNB, or eNB) may each include a multiple panel (or multi-panel) antenna array. FIG. 2 is a diagram illustrating a multi-panel antenna array according to an example embodiment. Multi-panel antenna array 210 may be used by or provided for a UE, for example. According to an example embodiment, multi-panel antenna array 210 may include a plurality (e.g., hundreds) of antenna elements (each antenna element indicated by "X" in FIG. 2) configured into multiple antenna panels, such as for antenna panels 212, 214, 216 and 218, as an illustrative example. While multi-panel antenna array 210 in FIG. 2 includes four antenna panels, any number of antenna panels may be provided or used (e.g., by a UE or a BS). Each antenna panel may generate a beam or perform beamforming, based on a set of beam weights applied to antenna elements of the antenna panel. In an example embodiment, each antenna panel may include one or more wireless transceivers (transmitter/receiver). For example, for each antenna panel, a transceiver may be provided for each of one or more polarizations (e.g., which may include, for example, one or both of azimuth polarization or elevation polarization, as examples).

An antenna panel may either be active (or activated) or inactive (or inactive or not activated). In an example of an inactive state of an antenna panel, power is usually not applied to the transceiver(s) of the antenna panel (e.g., to conserve power). Also, in an example inactive state of an antenna panel, a set of beam weights may not be applied to the antenna elements, and the inactive antenna panel does not perform beamforming or generate a beam for transmission or reception. On the other hand, according to an illustrative example of an active (or activated) state of an antenna panel, power is typically applied to the antenna panel transceiver(s) (to power on the panel transceivers). Thus, for example, When an antenna panel is active, the wireless transceiver(s) for the antenna panel are typically powered on, and/or a set of beam weights (e.g., each weight including an amplitude and phase) may be applied to the antenna elements so that the antenna panel may generate a beam (beamforming), e.g., to allow a signal to be transmitted or received via the generated beam. These are merely some illustrative examples of one or more features or characteristics of an inactive (or not activated) antenna panel, and of an active (or activated) antenna panel, and other examples of these may be used or provided.

To transmit and/or receive a signal via a beam generated (or beamformed) by an antenna panel, the antenna panel must first be activated (or placed in an active state), if not already active. According to an example embodiment, switching between an inactive panel and an active panel may, for example, include activating an inactive panel (so that such panel is now active), and/or de-activating an active panel (so that such panel is now inactive), to allow the UE (or other device) to now use the previously inactive panel, which has now been activated, for beamforming. In this manner, the UE man switch from using a first antenna panel to a second antenna panel, e.g., for beamforming for transmission or reception of a signal. According to an example embodiment, to switch (or transition) an antenna panel from an inactive state to an active (or activated) state, the UE may apply power to (or power on) the one or more transceivers (transmitter/receivers) of the antenna panel, and/or apply a set of beam weights to the antenna elements of the antenna panel.

A UE may have one or more active antenna panels at a time. According to an example embodiment, depending on UE capabilities, multiple antenna panels may, for example, allow a UE to simultaneously form both transmitter beamforming (where a beam is formed for the transmission of a signal) via a first antenna panel and receiver beamforming (where a beam is formed for the reception of a signal) via a second antenna panel. Thus, depending on the capabilities of a UE, a UE with multiple antenna panels may (at least in some cases) be capable of, e.g., simultaneously transmitting and receiving via separate antenna panels, transmitting a signal(s) via two or more antenna panels, and/or receiving signals via two or more antenna panels. Alternatively, at least in some cases, e.g., to conserve power, a UE may have only one antenna panel active (or activated) at a time, which may be used for transmitting or receiving. Thus, in an example embodiment, there may be one active antenna panel, or multiple, active antenna panels, depending on UE capabilities. As noted, panel switching from an active antenna panel to an inactive antenna panel may introduce significant delay or latency (due to panel activation delay), since the inactive panel should be activated before it can be used by the UE to transmit or receive a signal.

It may be advantageous for a UE to transmit and/or receive different signals via either a same antenna panel, or transmit and/or receive various signals via different antenna panels, depending on the situation. Also, a BS may request a UE to perform certain operations (transmit and/or receive specific signals) via one or more specific antenna panel (e.g., same panel) and/or via different antenna panels. Thus, in some cases, a UE may need to switch between panels, such as switching (for UE signal transmission or reception) from an active antenna panel to an inactive panel (e.g., in such case, the inactive panel must first be activated by the UE before it can be used to transmit or receive a signal). However, activating an antenna panel may require time (which may be referred to as a panel activation delay), e.g., time to allow the UE to power on the antenna panel transceiver(s), allow circuits of the transceiver(s) or antenna panel to reach a steady-state, and/or time for the UE to apply a set of beam weights to the antenna panel. For example, as part of the panel activation delay, the circuits of the antenna panel transceivers, after receiving power, may require time to reach a steady-state (e.g., allow electric transients on the circuits or electronics of the antenna panel to settle to a steady-state), before the antenna panel can be used for beamforming. According to an example embodiment, this panel activation delay should be accounted for or considered, and met by the BS resource scheduling, when considering timing (e.g., minimum latency) between transmission or reception of different signals using different panels (that may involve or require activating a previously inactive panel).

Thus, for sequential (or successive) UE operations (a UE transmitting or receiving different signals) may require less time/latency between the sequential operations if the same antenna panel is used for both operations (since no panel activation delay is required if the same active panel is used for both successive/sequential operations). On the other hand, if sequential UE operations will use different antenna panels and/or involving panel switching where an inactive panel will be activated (e.g., after the first operation and before the second operation), this will require additional delay or latency between the successive or sequential operations, due to the panel activation delay.

According to an example embodiment, for a set of UE operations (e.g., receiving and/or transmitting signals), there may be two modes (or categories) of operation for a UE:

1) In mode 1 (or a first mode of operation), for the set of UE operations, the UE does not perform panel switching between an active antenna panel and an inactive antenna panel. Thus, in mode 1 (or category 1), the UE does not (or at least is not required to) activate an inactive panel before performing one of the UE operations (e.g., the UE uses the same active panel to perform both operations, or may use two different active panels that are already active). Thus, for example, in mode 1, one antenna panel may be used to perform the set (or a plurality) of UE operations, and as a result, there is no delay/latency introduced (or required) between UE operations due to panel activation delay, according to an example embodiment.

2) In mode 2 (or a second mode of operation, or a second category), for a set of UE operations (e.g., transmitting and/or receiving a signal(s)), the UE will (or may be required to) perform panel switching between (or from) an active antenna panel to an inactive antenna panel. Thus, in mode 2 (or the second mode of operation), the UE will (or may) use two different panels to perform two (or multiple) UE operations, and the UE will need (or be required) to activate an inactive antenna panel before using that panel to perform one of the UE operations. As a result of the antenna panel activation that is required for one (or more) of the UE operations for mode 2, mode 2 introduces or requires an additional latency or delay between two successive operations (that use different panels) due to the panel activation delay required to activate an antenna panel that will (or may) be used to perform a second operation (or one of the operations of the set of UE operations).

According to an example embodiment, because each UE may have different capabilities (including different antenna panel capabilities, as well as different panel activation delays), a UE may report a different mode-specific timing (e.g., indicating a minimum latency or delay required by the UE between two UE operations), for both mode 1 and mode 2. By providing different mode-specific timing values (or different minimum latency or delay between two UE operations), for both mode 1 and mode 2, this may allow the BS to provide a mode-specific and UE-specific scheduling offsets (or times or locations) for time-frequency resources that may be used to perform the set of UE operations, depending on whether the UE is instructed to use mode 1 or mode 2 to perform the set of UE operations.

For example, for mode 1, this may allow the BS to provide a relatively short scheduling offset for a second UE operation with respect to a first UE operation, since two (as an illustrative example) UE operations may be performed relatively near each other in time, because a panel activation delay is not incurred for mode 1 before the second operation (because, e.g., the same active antenna panel may be used for the two UE operations. Alternatively, for mode 1, the UE may use a first active panel (already active) for a first operation and then use a second active (already active) panel for a second UE operation, and hence, there is no need to activate either of these panels.

For mode 2, this may allow (or require) the BS to provide a longer scheduling offset (to meet a longer required latency, due to panel activation delay) for a second UE operation with respect to a first UE operation, since these two (as an illustrative example) UE operations may be performed using different panels, and will (or at least may) require a panel activation, thus incurring an additional delay or latency of the panel activation delay before performing one of the operations (e.g., the second operation).

For example, by a UE providing to a BS mode-specific timing values, this may provide the advantage of avoiding a situation where a single timing value is provided for both modes of operation, since using a longer timing value (that satisfies or meets the longer latency requirements for mode 2) for mode 1 is unnecessary, and may render the second or later UE operation for mode 1 operation to be possibly stale or outdated (e.g., since a much longer delay or scheduling offset may be provided, which may be necessary in the case of mode 1, where, no panel switching is performed). Some examples will now be provided.

Figure 3:
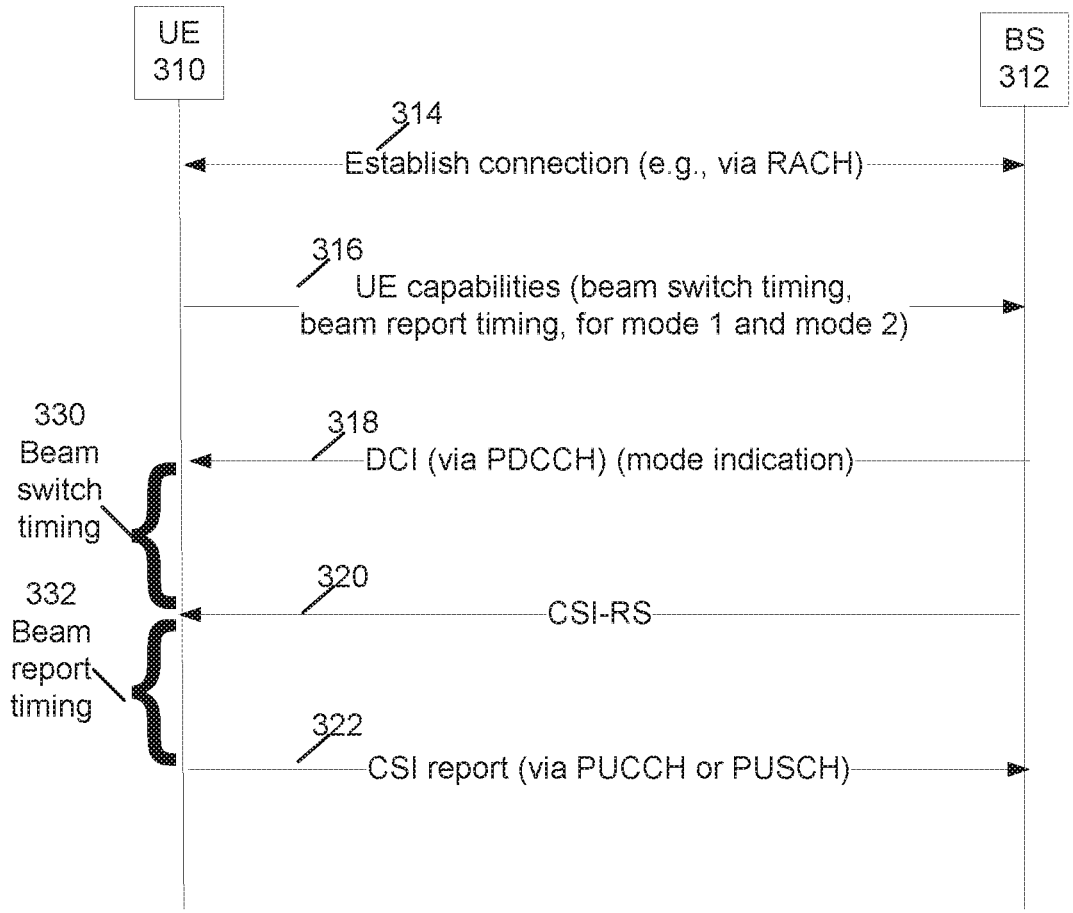
FIG. 3 is a diagram illustrating operation of a system according to an example embodiment.

FIG. 3 is a diagram illustrating operation of a system according to an example embodiment. UE 310 may be in communication with a BS (e.g., eNB, gNB) 312. At 314, the UE 310 may establish a connection with the BS 312, e.g., via a random access (RACH) procedure, or other procedure. At 316, the UE 310 may send capabilities information to the BS 312 to indicate one or more capabilities of the UE 310. As part of the example reported UE capabilities at 316, the UE may indicate a beam switch timing and/or a beam report timing, for mode 1 and/or mode 2, for example.

According to an example embodiment, a beam switch timing 330 may be (or may include), for UE 310, a minimum (or required) latency or delay between receiving at least one downlink control information (DCI) 318 (e.g., DCI with control information that triggers or causes UE to receive/measure the CSI-RS signals at 320) and receiving at least one channel state information reference signal (CSI-RS) 320 (a required or minimum difference in time between these two events). Also, according to an example embodiment, a beam report timing 332 may be or may include, for UE 310, a minimum (or required) latency or delay between receiving at least one channel state information reference signal (CSI-RS) 320 and transmitting a channel state information (CSI) report 322 to the BS 312. For example, at least one of (or even both of) the beam switch timing 330 and/or beam report timing 332 may be advantageously provided (e.g., via capabilities information at 316) by UE 310 to the BS 312 for at least one of, or even both of, mode 1 (or category 1) of UE operation, and/or mode 2 (or category 2) of UE operation.

Similar to CSI report 322, UE 310 may send to the BS 312 a timing information for sounding reference signals (SRS) to be transmitted by the UE 310, including for the mode 1 operation and/or mode 2 operation. The UE 310 may then receive or determine an indicated mode of operation for the sounding reference signals. For example, the timing information may include a switch timing that indicates, for the user equipment, a latency between receiving (by the UE) at least one downlink control information and transmitting (by the UE) at least one sounding reference signal for the at least one of the first mode of operation (e.g., in which the user equipment does not perform switching between an active antenna panel and an inactive panel of the plurality of antenna panels) or the second mode of operation (e.g., in which the user equipment performs switching between an active antenna panel and an inactive panel of the plurality of antenna panels); and the method further comprising receiving, by the user equipment, the at least one downlink control information and transmitting the at least one sounding reference signal in accordance with the indicated mode of operation.

According to an example embodiment, a method may include sending, by a user equipment that includes a plurality of antenna panels, to a base station, timing information including at least one of a beam switch timing or a beam report timing, wherein the timing information includes timing information provided for at least one of a first mode of operation or a second mode of operation, wherein the first mode of operation comprising the user equipment not performing switching between an active antenna panel and an inactive antenna panel of the plurality of antenna panels, and the second mode of operation comprising the user equipment performing switching between an active antenna panel and an inactive panel of the plurality of antenna panels; and receiving, by the user equipment from the base station, at least one downlink control information indicating a mode of operation for the user equipment, wherein the indicated mode of operation is at least one of the first mode of operation or the second mode of operation.

According to an example embodiment, antenna panel activation is not required for the first mode of operation, and antenna panel activation is required for the second mode of operation.

In an example embodiment, the method may further include performing, by the user equipment, at least one of transmitting a signal or receiving a signal in accordance with the indicated mode of operation (e.g., UE not performing switching between an active antenna panel and an inactive panel for mode 1, and UE performing switching between an active antenna panel and an inactive panel for mode 2).

According to an example embodiment, the timing information may include at least one of the beam switch timing or the beam report timing for both of the first mode of operation and the second mode of operation.

According to an example embodiment, the beam switch timing may include a latency between receiving the at least one downlink control information and receiving at least one channel state information reference signal. Also, for example, the beam report timing may include a latency between receiving at least one channel state information reference signal and transmitting at least one channel state information report to the base station. For example, the latency may include a minimum value of the latency.

The mode of operation may be indicated either explicitly (e.g., via the downlink control information (DCI) including an instruction), or indirectly based on a scheduling offset. Thus, according to an example embodiment, the at least one downlink control information may include an instruction (e.g., explicitly or directly) indicating the mode of operation for the user equipment as either the first mode of operation or the second mode of operation. In another example embodiment, the at least one downlink control information may include a scheduling offset for at least one channel state information reference signal or at least one channel state information report, wherein the mode of operation for the user equipment is based on the scheduling offset.

According to another example embodiment, a method may include receiving, by a base station from a user equipment that includes a plurality of antenna panels, timing information including at least one of a beam switch timing or a beam report timing, wherein the timing information includes timing information provided for at least one of a first mode of operation or a second mode of operation, wherein the first mode of operation comprising the user equipment not performing switching between an active antenna panel and an inactive antenna panel of the plurality of antenna panels, and the second mode of operation comprising the user equipment performing switching between an active antenna panel and an inactive panel of the plurality of antenna panels; selecting a mode of operation for the user equipment as either the first mode of operation or the second mode of operation; and sending, by the base station to the user equipment, at least one downlink control information indicating the selected mode of operation for the user equipment.

Beam switch timing—BS may schedule the DL (downlink) transmission of the DCI (downlink control information), and DL CSI-RS (channel state information reference signals) transmission. DCI may indicate the scheduled timing (time-frequency resources) for CSI-RS. There is a scheduling offset, which may be, for example, the time between the scheduled DCI and the scheduled CSI-RS UL (e.g., which may be the time between UE receiving DCI, and receiving CSI-RS).

Beam report timing—BS may schedule UL (uplink) resources at a scheduling offset for UL transmission of CSI report from (or with respect to) CSI-RS transmission (or CSI-RS receipt). Thus, if a BS uses a long latency/long scheduling offset (required for antenna panel switching, mode 2) for the case without panel switching (where no panel switching is performed), the CSI-RS beam report (e.g., as a short term CSI report) may be stale or outdated by the time the short term CSI report is received by the BS. Hence, at least in some cases, there may be a need, for example, for two sets of timings from the UE—one without antenna panel switching (mode 1 or category 1), and one with antenna panel switching (mode 2 or category 2).

In an example embodiment, BS may assume mode 1 (category 1) operation of UE when BS is requesting short term CSI report (e.g., which may include channel quality information (CQI), precoding matrix indicator (PMI), rank indication (RI)). In this manner, a short scheduling offset for CSI report is provided that meets latency for mode 1, but does not meet latency for mode 2, so that the CSI report will be timely. If UE is using panel switching, then UE will not be able to send the CSI report at the scheduled resource(s), because insufficient scheduling offset was provided for mode 2 for CSI report. This may allow, for example, for BS to receive CSI report from current active panel, without switching between an active antenna panel and an inactive antenna panel.

According to an example embodiment, a UE may report to the BS a beam switch time and/or beam report timing for two modes of operation. In mode 1 (a first mode of operation for the UE), the UE does not performing switching between an active antenna panel and an inactive antenna panel of a plurality of antenna panels, and thus, typically the UE will not be required to activate an antenna panel (thus avoiding the panel switching delay). For example, a UE may be able to perform multiple UE operations (receiving and/or transmitting signals) using one (or more) already active antenna panels, e.g., without needing to activate an inactive antenna panel. Thus, in mode 1, one or more UE operations may be scheduled using a shorter scheduling offset because, for example, a panel switching delay may not necessarily be incurred.

In mode 2 (a second mode of operation of the UE), the UE performs switching between an active antenna panel and an inactive antenna panel of the plurality of antenna panels, and may activate the inactive antenna panel so that it may be used to now perform beamforming to transmit and/or receive a signal. Thus, for example, in mode 2, a longer scheduling offset may be required for one or more UE operations, e.g., due to a panel switching delay that may be incurred when activating an inactive panel, for example.

According to an example embodiment, UE may also report how many antenna panels the UE supports, and this may indicate to BS/gNB about how many different measurement occasions would be needed for BS/gNB to obtain instance measurement results from all of the antenna panels.

Also, for example, a serving panel may be a currently active panel, e.g., such as an active panel that is used to receive current activated downlink beams (e.g., activated TCI states for physical downlink control channel (PDCCH) or physical downlink shared channel (PDSCH) and activated uplink beams (e.g., activated spatial sources for physical uplink control channel (PUCCH)) without needing any panel switching. The UE may include one active antenna panel (in some example embodiments), or may include multiple active antenna panels (in other example embodiments), at a time.

According to an example embodiment, for the CSI report acquisition (CSI-RS measurement triggering and reporting), the BS/gNB indicates in a triggering command (e.g., instruction in DCI to request CSI report from UE) whether the CSI (which may include in general L1-RSRP (layer 1 reference signal received power) for beam measurements, PMI, RI, CQI) is: 1) to be measured and reported using the serving or currently active panel (mode 1, or category 1), or 2) to be measured using some other panel (which may be an inactive panel that first must be activated) and reported to BS using the serving panel (mode 2, where panel switching may be involved to switch to the other panel for measurement, and then transmit report using the original serving/active panel).

A BS/gNB may use different techniques to indicate a selected mode of operation (e.g., as either mode 1, or mode 2). In a first example embodiment, the downlink control information (DCI) may explicitly indicate a mode of operation (e.g., either mode 1 or mode 2) by including an instruction indicating the mode of operation for the UE as either the first mode (mode 1) of operation or the second mode (mode 2) of operation. For example, DCI may explicitly include an instruction (e.g., a bit or flag) to indicate measurement with either serving (or currently active) antenna panel (mode 1), or a non-serving (a currently inactive panel that would need to first be activated) (mode 2), and then a beam/CSI report may be transmitted by the UE to BS via the original serving/active antenna panel.

In a second example embodiment, the DCI may indirectly or implicitly indicate the mode of operation (e.g., either mode 1 or mode 2) based on a scheduling offset for a second UE operation. For example, if the scheduling offset for a second UE operation (e.g., transmitting a CSI report), indicated within DCI received from the BS, is greater than or equal to the beam report timing for mode 2 (second mode of operation), this may (indirectly) indicate that the second mode of operation should be used for the UE operations. Beam report timing, and/or beam switch timing (or other timing) may be indicated in absolute or relative time (e.g., ms), symbols, slots, subframes, or other time measurement.

According to an illustrative example, a beam switch timing (e.g., indicating an amount of time that is required by the UE to receive/measure CSI-RS after receiving DCI signals) may be indicated as 2 slots for mode 1, and 5 slots for mode 2. Thus, for example, if a scheduling offset for the CSI-RS with respect to the DCI (an amount of time between scheduled DCI and scheduled CSI-RS) is 5 slots or more, then this may indirectly indicate to the UE that mode 2 should be used for the measurement of CSI-RS signals (e.g., allowing or instructing the UE to measure the CSI-RS signals using an inactive antenna panel, by switching from active antenna panel to an inactive antenna panel (e.g., after activating the inactive antenna panel). The DCI (or other control information) may also indicate the antenna panel that should be used to receive/measure the CSI-RS signals, for example (e.g., control information within DCI identifying one of the inactive antenna panels of the UE that should be used to measure the CSI-RS signals).

On the other hand, if the if the scheduling offset for the CSI-RS signals (e.g., the amount of time between scheduled DCI and scheduled CSI-RS) is less than 5 slots (e.g., only 2, 3 or 4 slots), then this may indirectly indicate to the UE that mode 1 (no panel switching between an inactive antenna panel and active antenna panel) should be used for the receiving and measurement of CSI-RS signals (thus, instructing the UE to use mode 1, and use the same active antenna panel to both receive the DCI signals and to receive/measure CSI-RS signals), since insufficient time is provided to allow for UE to perform panel switching between receiving DCI and receiving CSI-RS signals for mode 2, but sufficient time is provided to allow mode 1 operation.

Similarly, a scheduling offset for CSI report (e.g., an amount of time between a scheduled CSI report and scheduled CSI-RS signals) may indirectly indicate a mode of operation that should be used for the UE to measure CSI-RS signals and/or transmit the CSI report. If the scheduling offset for the scheduled CSI report with respect to the scheduled CSI-RS signals is greater than or equal to the beam report timing for mode 2, then this may indicate that mode 2 operation should be used for transmission of the CSI report (e.g., instructing or allowing UE to perform switching between an active antenna panel and an inactive antenna panel), thereby allowing CSI-RS signals to be measured using an active/serving antenna panel, and then activating and using an inactive antenna panel to transmit the CSI report.

Alternatively or in addition, gNB triggering CSI measurement and reporting using scheduling offsets according to mode 1 the reference signals (RSs) to be measured may be spatially Quasi-co-located (QCLed) (e.g., which may include using a same beam and/or transmitted from same (or nearly same) location) with the current candidate/activated spatial QCL sources for PDCCH and/or PDSCH and/or TRS signals. Based on being QCLed, this may indicate that UE can assume that the same antenna panel can be used for CSI measurements as the current serving/active panel (e.g., some antenna panels may cover only specific or limited directions). As an option, when scheduled offset is less than mode 2 timing (minimum latency), this this tells UE it can use the current panel (but beam may be different beam for either DCI/PDCCH, or PDSCH or TRS).

According to an example embodiment, to facilitate CSI-RS measurements and reporting across a set of or all the panels in a row and reporting, the BS/gNB may request measurements on chained CSI-RS resource sets (which may be within one or multiple triggering states), e.g., where chaining means that UE determines triggering offset in the following manner (using one or more of the following): for the first CSI-RS resource set in the chain: the UE determines triggering offset as given in the configuration; for the Nth CSI-RS resource set where N>1, the UE determines aperiodic CSI-RS to be transmitted with slot offset relative to the N-lth CSI-RS resource set transmission time; slot offset for beam reporting in the end of the chained CSI-RS resource set transmission is determined to be between the last CSI-RS resource set transmission and transmission of the report; and, BS/gNB may configure triggering offset per each CSI-RS resource set either with offset value fulfilling mode 1 operation (no panel switch involved) or category 2 (panel switch involved).

The same principle as for CSI-RS measurement triggering can be applied for the UE's transmission of sounding reference signals (SRS), e.g., there may be two different allowed minimum timings defined between triggering DCI and SRS transmissions and provided by UE as capability: one for the serving panel (e.g., DCI received and SRS transmitted using the serving panel) —mode 1; and, another timing for the non-serving panel (e.g., DCI received on serving panel and SRS transmitted using some non-serving panel) —mode 2 operation.

In addition, according to an example embodiment, the following rule may be used for the triggered SRS (e.g., for beam management), using scheduling offset according to mode 1: the spatial (e.g., beam) sources (which can be DL RSs) for SRS resources to be transmitted are spatially quasi-co-located (QCLed) (same or nearly the same beam resources) with or are the same as activated spatial sources for uplink channels and signals like PUCCH and semi-persistent SRS and aperiodic SRS. SRS is uplink reference signals. For example, a spatial source may refer to downlink reference signals upon which the UE may determine its transmit beam, or may refer to uplink reference signals (e.g., UE may use transmit beam to transmit uplink reference signals (e.g., sounding reference signals (SRS)). If the DCI to SRS scheduling offset is less than required for mode 2 (involving panel switching), then the UE would use current serving panel to transmit UL SRS signals (since there is not sufficient offset or time for panel switching); and If the DCI to SRS scheduling offset is greater than or equal to category 2 minimum latency, then the UE could use a non-serving panel for transmission of SRS (allow UE to select a non-serving panel for SRS transmission). For example, after UE has transmitted SRS with non-serving panel, there should a minimum latency (mode 2 minimum latency) (UE not required/scheduled to UL transmit anything during this minimum latency) to allow UE to switch back to original active panel). (only for UL transmission of SRS). This may allow or ensure that UE can assume that the same the current serving/active panel can be used for SRS transmissions. In alternative embodiment, the indicated offset for SRS measurements provided (e.g., by triggering state) determines implicitly whether UE reports assuming category 1 or category 2.

Some example UE example steps or operations related to CSI-RS measurements and reporting (CSI report): 1) Capabilities information indicates two timings for mode 1 and mode 2: UE provides different beam switching and beam report timing capabilities to gNB for the cases/modes 1) panel switching is not involved (mode 1) and 2) panel switching is involved (mode 2); 2) UE receives DCI, which triggers CSI measurement and reporting. 3) UE determines from the trigger (e.g., control information or instruction within DCI) whether current serving/active panel (mode 1) is to be used for the CSI-RS measurement, or a non-serving panel (category 2) is to be used for the measurement. DCI indicates the panel to be used for CSI-RS measurement, either explicitly, or implicitly based on the scheduling offset. If offset for CSI report is greater than or equal to beam report timing for mode 2, this indicates the UE should use an inactive antenna panel (e.g., activate this inactive panel, and then use for measurement) to measure CSI-RS. Otherwise, if offset for CSI report is less than beam report timing for mode 2, this indicates the UE should use currently active/serving antenna panel for CSI-RS measurement. Thus, in an illustrative example, the UE may determine mode from indicated scheduling offset, i.e., if scheduling offset for CSI report is lower than allowed by mode 2, the UE determines that mode 1 should be used (current active panel/serving panel to be used for measurement and reporting). Otherwise, the UE may assume mode 2 and may use an inactive or non-serving panel for CSI measurements. 4) UE performs CSI measurement and reporting using the panel(s) determined in 33 (based on mode determination).

Some example BS/gNB example steps or operations related to CSI-RS measurements and reporting. 1) gNB receives UE capability information regarding allowed minimum scheduling offsets for mode 1 (antenna panel switching not involved) and mode 2 (antenna panel switching involved). 2A) gNB decides to acquire CSI from the serving panel: gNB triggers CSI measurement and reporting from the serving panel using scheduling offsets that are above model minimum values, but less than mode 2 timing value(s). gNB may explicitly indicate in DCI to request measurement from serving panel. Or, UE determines implicitly the serving panel to be used from the given scheduling offsets and Quasi colocation (QCL) relationships between RSs to be measured and current activated QCL source RSs for PDCCH and/or PDSCH and/or TRS (tracking reference signal). 2B) Alternatively, gNB decides to acquire CSI from a non-serving (inactive) panel: gNB triggers CSI measurement and reporting from an inactive or non-serving antenna panel using scheduling offsets that are above mode 2 minimum values.

QCL—Quasi co-located: signals coming from same direction—so UE can use same gain/power and beam (spatial relationship), and/or may use same antenna panel to receive two different signals that are quasi co-located. This is because each of antenna panels may be directional or cover beamforming for a range of directions/beams. For example, for quasi co-located signals, if the scheduling offset is less than mode 2 requirement, then the UE may assume that beams to be measured are among the candidate transmit beams for PDCCH, PDSCH and TRS for which the UE has a panel active. Also, for example, for obtaining a measurement using a non-active antenna panel, then the offset for CSI-RS needs to be above mode 2, e.g., to allow the UE to perform panel switching from the non-active antenna panel (which was activated to receive CSI-RS) back to the original active antenna panel for transmission of the CSI reports. Thus, panel switching may be performed for transmitting CSI report, if a scheduling offset for CSI report (with respect to scheduled CSI-RS) is greater than or equal to mode 2 requirement for beam report timing, for example, to allow switching of panel back to the original active panel.

SOME EXAMPLE ADVANTAGES

Various techniques may enhance CSI acquisition accuracy and in general address CSI measurement and reporting related problems. Excess latency may be reduced or avoided, by providing and using timing information for different modes of operation, such as mode 1 (no panel switching involved) and mode 2 (panel switching involved), to address specific issues related to UE use of multiple antenna panels.

Figure 4:
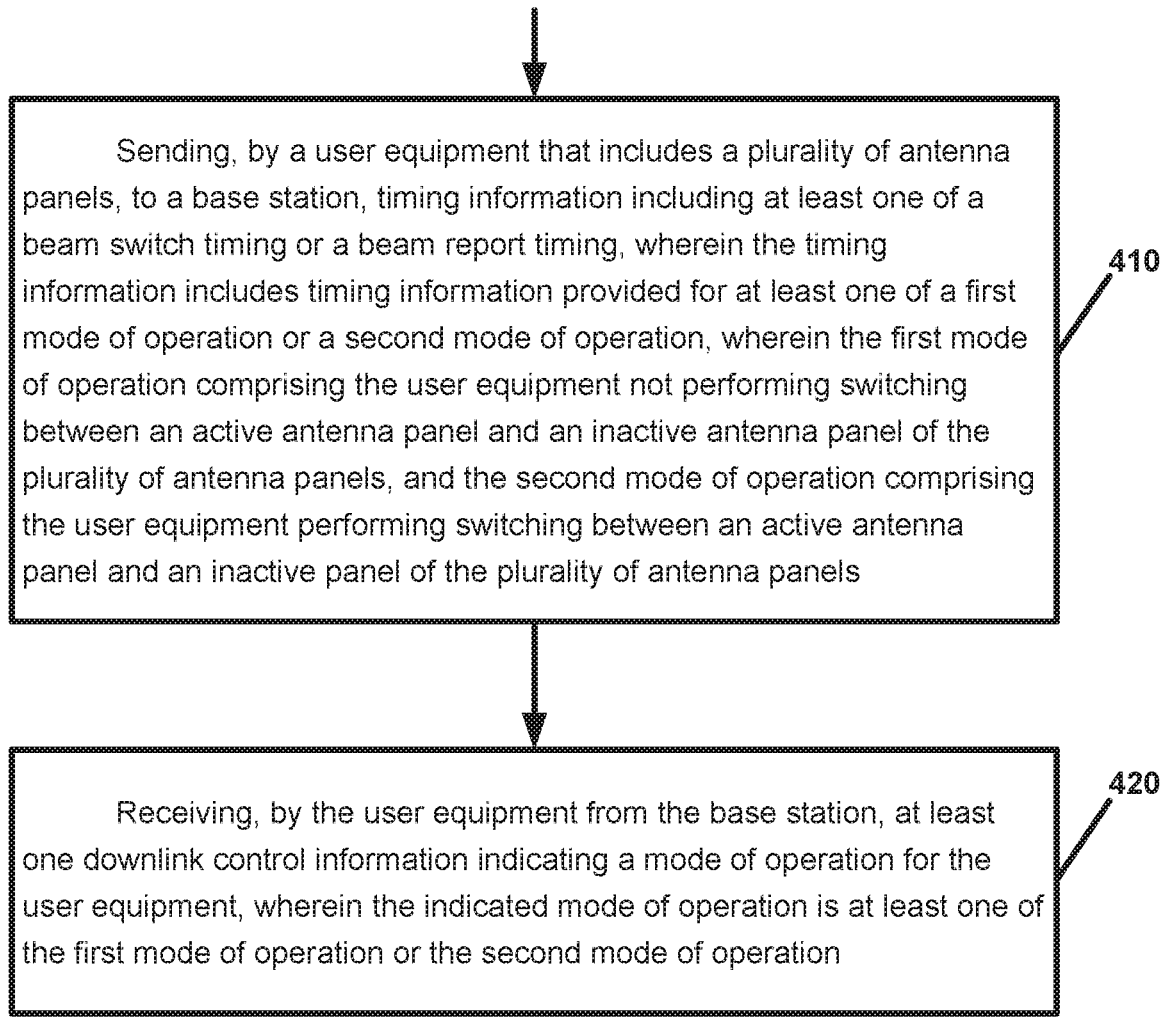
FIG. 4 is a flow chart illustrating operation of a user equipment according to an example embodiment.

Example 1. FIG. 4 is a flow chart illustrating operation of a user equipment according to an example embodiment. Operation 410 includes sending, by a user equipment that includes a plurality of antenna panels, to a base station, timing information including at least one of a beam switch timing or a beam report timing, wherein the timing information includes timing information provided for at least one of a first mode of operation or a second mode of operation, wherein the first mode of operation comprising the user equipment not performing switching between an active antenna panel and an inactive antenna panel, and the second mode of operation comprising the user equipment performing switching between an active antenna panel and an inactive panel. And, operation 420 includes receiving, by the user equipment, at least one downlink control information indicating a mode of operation for the user equipment, wherein the indicated mode of operation is at least one of the first mode of operation or the second mode of operation.

Example 2. The method of Example 1, wherein antenna panel activation is not required for the first mode of operation, and antenna panel activation is required for the second mode of operation.

Example 3. The method of any of Examples 1-2, further comprising: performing, by the user equipment, at least one of transmitting a signal or receiving a signal in accordance with the indicated mode of operation.

Example 4. The method of any of Examples 1-3, wherein the timing information comprises at least one of the beam switch timing or the beam report timing for both of the first mode of operation and the second mode of operation.

Example 5. The method of any of Examples 1-4, wherein the beam switch timing comprises a latency between receiving the at least one downlink control information and receiving at least one channel state information reference signal.

Example 6. The method of any of Examples 1-5, wherein the beam report timing comprises a latency between receiving at least one channel state information reference signal and transmitting at least one channel state information report to the base station.

Example 7. The method of any of Examples 5-6, wherein the latency comprises a minimum value of the latency.

Example 8. The method of any of Examples 1-7, wherein the at least one downlink control information includes an instruction indicating the mode of operation for the user equipment as either the first mode of operation or the second mode of operation.

Example 9. The method of any of Examples 1-8, wherein the at least one downlink control information includes a scheduling offset for at least one channel state information reference signal or at least one channel state information report, wherein the mode of operation for the user equipment is based on the scheduling offset.

Example 10. The method of any of Examples 1-9, wherein the received at least one downlink control information includes a first scheduling offset for receiving at least one channel state information reference signal with respect to the received at least one downlink control information; the method further comprising: determining, by the user equipment, whether the first scheduling offset is greater than or equal to the beam switch timing for the user equipment for the second mode of operation; determining that the first scheduling offset indicates the first mode of operation, for receiving the at least one downlink control information and receiving at least one channel state information reference signal, if the first scheduling offset is not greater than or equal to the beam switch timing for the user equipment for the second mode of operation; and determining that the first scheduling offset indicates the second mode of operation, for receiving the at least one downlink control information and receiving the at least one channel state information reference signal, if the first scheduling offset is greater than or equal to the beam switch timing for the user equipment for the second mode of operation.

Example 11. The method of any of Examples 1-9, wherein the received at least one downlink control information includes a second scheduling offset for transmitting of at least one channel state information report with respect to receiving of at least one channel state information reference signal; determining, by the user equipment, whether the second scheduling offset is greater than or equal to the beam report timing for the user equipment for the second mode of operation; determining that the second scheduling offset indicates the first mode of operation for the receiving of the at least one channel state information reference signal and the transmitting of the at least one channel state information report if the second scheduling offset is not greater than or equal to the beam report timing for the user equipment for the second mode of operation; and determining that the second scheduling offset indicates the second mode of operation for the receiving of the at least one channel state information reference signal and the transmitting of the at least one channel state information report if the second scheduling offset is greater than or equal to the beam report timing for the user equipment for the second mode of operation.

Example 12. The method of any of any of Examples 3-11, wherein the performing comprises the following if the indicated mode of operation is the first mode of operation: receiving, by the user equipment, the at least one downlink control information using an active antenna panel of the plurality of antenna panels; and receiving at least one channel state information reference signal using the active antenna panel, without switching to an inactive antenna panel.

Example 13. The method of any of any of Examples 3-11, wherein the performing comprises the following if the indicated mode of operation is the second mode of operation: receiving, by the user equipment, the at least one downlink control information using a first antenna panel of the plurality of antenna panels, wherein the first antenna panel is an active antenna panel, and a second antenna panel is an inactive antenna panel; switching, by the user equipment, from the first antenna panel to the second antenna panel of the plurality of antenna panels; receiving, by the user equipment, at least one channel state information reference signal using the second antenna panel of the plurality of antenna panels.

Example 14. The method of any of any of Examples 3-11, wherein the performing comprises the following if the indicated mode of operation is the first mode of operation: receiving, by the user equipment, at least one channel state information reference signal using an active antenna panel of the plurality of antenna panels; and transmitting, by the user equipment, at least one channel state information report to the base station using the active antenna panel, without switching to an inactive antenna panel.

Example 15. The method of any of any of Examples 3-11, wherein the performing comprises the following if the indicated mode of operation is the second mode of operation: receiving, by the user equipment, at least one channel state information reference signal using a first antenna panel of the plurality of antenna panels, wherein the first antenna panel is an active antenna panel, and a second antenna panel is an inactive antenna panel; switching, by the user equipment, from the first antenna panel to the second antenna panel of the plurality of antenna panels; and transmitting, by the user equipment, at least one channel state information report to the base station using the second antenna panel.

Example 16. The method of any of Examples 13 and 15 wherein the switching comprises activating the second antenna panel.

Example 17. The method of any of Examples 1-16, wherein the beam switch timing for the first mode of operation comprises a minimum latency between receiving the at least one downlink control information using an active antenna panel and a first beam, and receiving at least one channel state information reference signal using the active antenna panel and a second beam, without switching to an inactive antenna panel.

Example 18. The method of any of Examples 1-17, wherein the timing information includes a switch timing that indicates, for the user equipment, a latency between receiving the at least one downlink control information and transmitting at least one sounding reference signal for the at least one of the first mode of operation or the second mode of operation; and the method further comprising receiving, by the user equipment, the at least one downlink control information and transmitting the at least one sounding reference signal in accordance with the indicated mode of operation.

Example 19. The method of Example 18, wherein the receiving the at least one downlink control information and transmitting the at least one sounding reference signal comprises the following if the indicated mode of operation is the first mode of operation: receiving, by the user equipment, the at least one downlink control information using an active antenna panel of the plurality of antenna panels; and transmitting the at least one sounding reference signal using the active antenna panel, without switching to an inactive antenna panel.

Example 20. The method of Example 18, wherein the receiving the at least one downlink control information and transmitting the at least one sounding reference signal comprises the following if the indicated mode of operation is the second mode of operation: receiving, by the user equipment, the at least one downlink control information using a first antenna panel of the plurality of antenna panels, wherein the first antenna panel is an active antenna panel, and a second antenna panel is an inactive antenna panel; switching, by the user equipment, from the first antenna panel to the second antenna panel of the plurality of antenna panels, wherein the second antenna panel was inactive; transmitting, by the user equipment, the at least one sounding reference signal using the second antenna panel of the plurality of antenna panels.

Example 21. An apparatus comprising means for performing the method of any of Examples 1-20.

Example 22. A non-transitory computer-readable storage medium comprising instructions stored thereon that, when executed by at least one processor, are configured to cause a computing system to perform the method of any of Examples 1-20.

Example 23. An apparatus comprising: at least one processor; and at least one memory including computer program code; the at least one memory and the computer program code configured to, with the at least one processor, cause the apparatus at least to perform the method of any of Examples 1-20.

Example 24. An apparatus comprising: at least one processor; and at least one memory including computer program code; the at least one memory and the computer program code configured to, with the at least one processor, cause the apparatus to: send, from a user equipment, to a base station, timing information including at least one of a beam switch timing or a beam report timing, wherein the timing information includes timing information provided for at least one of a first mode of operation or a second mode of operation, wherein the first mode of operation comprising the apparatus not performing switching between an active antenna panel and an inactive antenna panel of a plurality of antenna panels, and the second mode of operation comprising the apparatus performing switching between an active antenna panel and an inactive panel of the plurality of antenna panels; and receive, at the user equipment from the base station, at least one downlink control information indicating a mode of operation for the apparatus, wherein the indicated mode of operation is at least one of the first mode of operation or the second mode of operation.

Example 25. The apparatus of Example 24, wherein antenna panel activation is not required for the first mode of operation, and antenna panel activation is required for the second mode of operation.

Example 26. The apparatus of any of Examples 24-25, wherein the timing information includes at least one of the beam switch timing or the beam report timing for both of the first mode of operation and the second mode of operation.

Example 27. The apparatus of any of Examples 24-26, wherein the beam switch timing comprises a latency between receiving the at least one downlink control information and receiving at least one channel state information reference signal.

Example 28. The apparatus of any of Examples 24-27, wherein the beam report timing comprises a latency between receiving at least one channel state information reference signal and transmitting at least one channel state information report to the base station.

Figure 5:
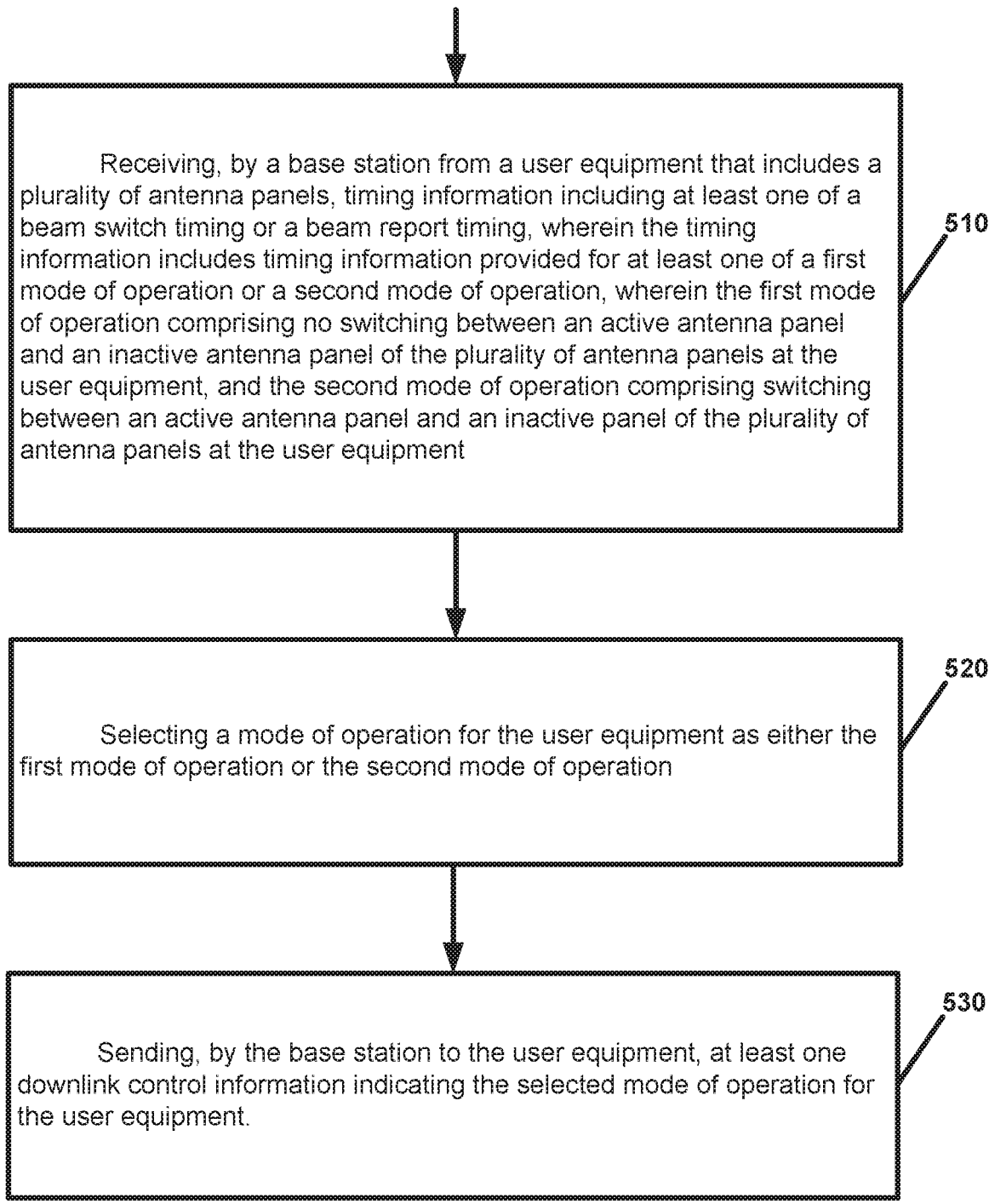
FIG. 5 is a flow chart illustrating operation of a base station according to an example embodiment.

Example 29. FIG. 5 is a flow chart illustrating operation of a base station (e.g., BS, eNB, gNB) according to an example embodiment. Operation 510 includes receiving, by a base station from a user equipment that includes a plurality of antenna panels, timing information including at least one of a beam switch timing or a beam report timing, wherein the timing information includes timing information provided for at least one of a first mode of operation or a second mode of operation, wherein the first mode of operation comprising no switching between an active antenna panel and an inactive antenna panel of the plurality of antenna panels at the user equipment, and the second mode of operation comprising switching between an active antenna panel and an inactive panel of the plurality of antenna panels at the user equipment. Operation 520 includes selecting a mode of operation for the user equipment as either the first mode of operation or the second mode of operation. And, operation 530 includes sending, by the base station to the user equipment, at least one downlink control information indicating the selected mode of operation for the user equipment.

Example 30. The method of Example 29, wherein antenna panel activation is not required for the first mode of operation, and antenna panel activation is required for the second mode of operation.

Example 31. The method of any of Examples 29-30, wherein the timing information includes at least one of the beam switch timing or the beam report timing for both of the first mode of operation and the second mode of operation.

Example 32. The method of any of Examples 29-31, wherein the beam switch timing comprises a latency between receiving the at least one downlink control information and receiving at least one channel state information reference signal.

Example 33. The method of any of Examples 29-32, wherein the beam report timing comprises a latency between receiving at least one channel state information reference signal and transmitting at least one channel state information report to the base station.

Example 34. The method of any of Examples 29-33, wherein the latency comprises a minimum value of the latency.

Example 35. The method of any of Examples 29-34, wherein the at least one downlink control information includes an instruction indicating the mode of operation for the user equipment as either the first mode of operation or the second mode of operation.

Example 36. The method of any of Examples 29-35, wherein the at least one downlink control information includes a scheduling offset for at least one channel state information reference signal or at least one channel state information report, wherein the mode of operation for the user equipment is based on the scheduling offset.

Example 37. The method of any of Examples 29-36, wherein the at least one downlink control information includes a first scheduling offset for receiving of at least one channel state information reference signal with respect to the at least one downlink control information; wherein the first mode of operation is indicated for the user equipment for the receiving the at least one downlink control information and receiving the at least one channel state information reference signal if the first scheduling offset is less than the beam switch timing for the user equipment for the second mode of operation; and wherein the second mode of operation is indicated for the user equipment for the receiving the at least one downlink control information and the receiving the at least one channel state information reference signal if the first scheduling offset is greater than or equal to the beam switch timing for the user equipment for the second mode of operation.

Example 38. The method of any of Examples 29-37, wherein the at least one downlink control information includes a second scheduling offset for transmitting of at least one channel state information report with respect to receiving of at least one channel state information reference signal; wherein the first mode of operation is indicated for the user equipment for the receiving of the at least one channel state information reference signal and the transmitting of the at least one channel state information report, by the user equipment, if the second scheduling offset less than the beam report timing for the user equipment for the second mode of operation; and wherein the second mode of operation is indicated for the user equipment for the receiving of the at least one channel state information reference signal and the transmitting of the at least one channel state information report, by the user equipment, if the second scheduling offset is greater than or equal to the beam report timing for the user equipment for the second mode of operation.

Example 39. The method of any of Examples 29-38, further comprising: receiving, by the base station from the user equipment, timing information including at least one sounding reference signal switch timing that indicates a minimum latency between receiving the at least one downlink control information at the user equipment and transmitting the at least one sounding reference signal from the user equipment for at least one of a first mode of operation in which no switching between an active antenna panel and an inactive antenna panel of the plurality of antenna panels at the user equipment, and a second mode of operation in which switching between an active antenna panel and an inactive panel of the plurality of antenna panels at the user equipment.

Example 40. An apparatus comprising means for performing the method of any of Examples 29-39.

Example 41. A non-transitory computer-readable storage medium comprising instructions stored thereon that, when executed by at least one processor, are configured to cause a computing system to perform the method of any of Examples 29-39.

Example 42. An apparatus comprising: at least one processor; and at least one memory including computer program code; the at least one memory and the computer program code configured to, with the at least one processor, cause the apparatus at least to perform the method of any of Examples 29-39.

Example 43. An apparatus comprising: at least one processor; and at least one memory including computer program code; the at least one memory and the computer program code configured to, with the at least one processor, cause the apparatus to: receive, by a base station from a user equipment that includes a plurality of antenna panels, timing information including at least one of a beam switch timing or a beam report timing, wherein the timing information includes timing information provided for at least one of a first mode of operation or a second mode of operation, wherein the first mode of operation comprising no switching between an active antenna panel and an inactive antenna panel of the plurality of antenna panels at the user equipment, and the second mode of operation comprising switching between an active antenna panel and an inactive panel of the plurality of antenna panels at the user equipment; select a mode of operation for the user equipment as either the first mode of operation or the second mode of operation; and send, by the base station to the user equipment, at least one downlink control information indicating the selected mode of operation for the user equipment.

Figure 6:
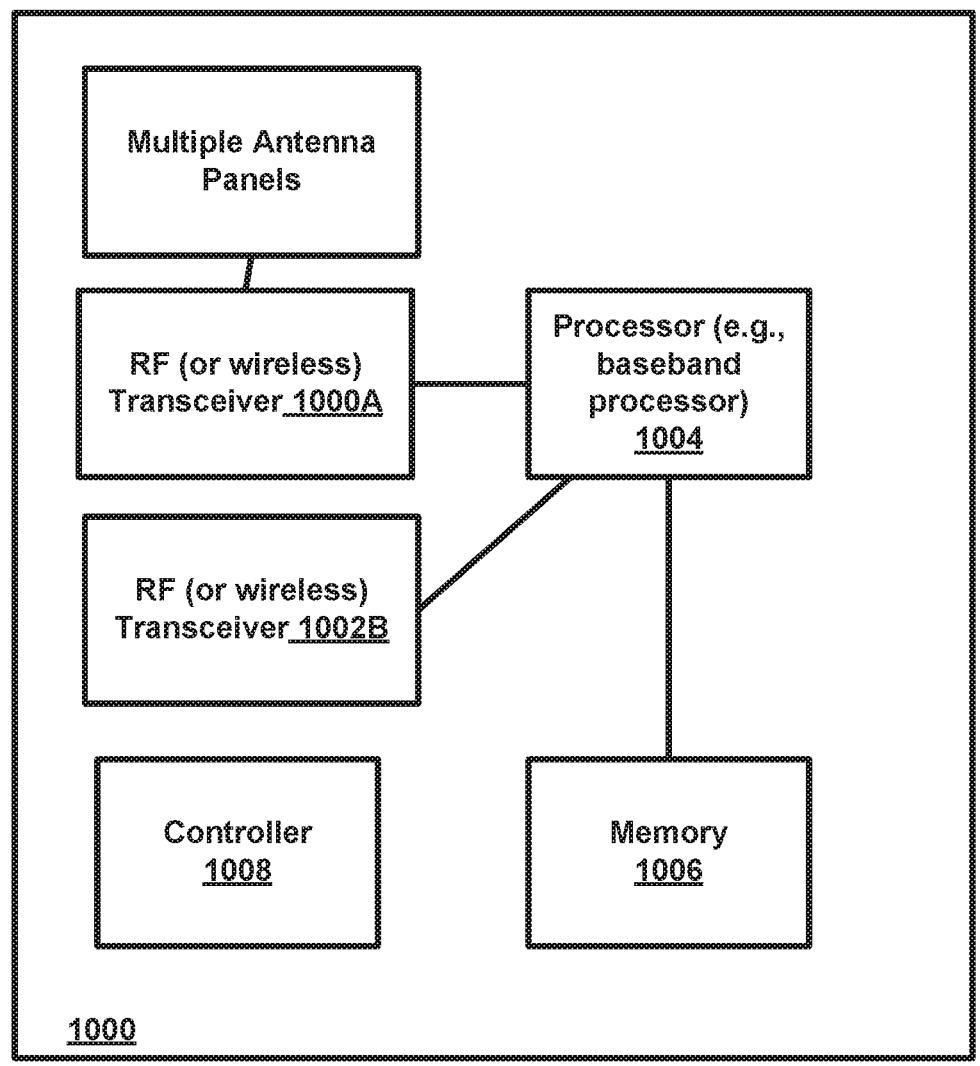
FIG. 6 is a block diagram of a wireless station (e.g., AP, BS, RAN node, UE or user device, or other network node) according to an example embodiment.

FIG. 6 is a block diagram of a wireless station (e.g., AP, BS or user device/UE, or other network node) 1000 according to an example embodiment. The wireless station 1000 may include, for example, one or more (e.g., two as shown in FIG. 6) RF (radio frequency) or wireless transceivers 1002A, 1002B, where each wireless transceiver includes a transmitter to transmit signals and a receiver to receive signals. The wireless station also includes a processor or control unit/entity (controller) 1004 to execute instructions or software and control transmission and receptions of signals, and a memory 1006 to store data and/or instructions.

Processor 1004 may also make decisions or determinations, generate frames, packets or messages for transmission, decode received frames or messages for further processing, and other tasks or functions described herein. Processor 1004, which may be a baseband processor, for example, may generate messages, packets, frames or other signals for transmission via wireless transceiver 1002 (1002A or 1002B). Processor 1004 may control transmission of signals or messages over a wireless network, and may control the reception of signals or messages, etc., via a wireless network (e.g., after being down-converted by wireless transceiver 1002, for example). Processor 1004 may be programmable and capable of executing software or other instructions stored in memory or on other computer media to perform the various tasks and functions described above, such as one or more of the tasks or methods described above. Processor 1004 may be (or may include), for example, hardware, programmable logic, a programmable processor that executes software or firmware, and/or any combination of these. Using other terminology, processor 1004 and transceiver 1002 together may be considered as a wireless transmitter/receiver system, for example.

In addition, referring to FIG. 6, a controller (or processor) 1008 may execute software and instructions, and may provide overall control for the station 1000, and may provide control for other systems not shown in FIG. 6, such as controlling input/output devices (e.g., display, keypad), and/or may execute software for one or more applications that may be provided on wireless station 1000, such as, for example, an email program, audio/video applications, a word processor, a Voice over IP application, or other application or software.

In addition, a storage medium may be provided that includes stored instructions, which when executed by a controller or processor may result in the processor 1004, or other controller or processor, performing one or more of the functions or tasks described above.

According to another example embodiment, RF or wireless transceiver(s) 1002A/1002B may receive signals or data and/or transmit or send signals or data. Processor 1004 (and possibly transceivers 1002A/1002B) may control the RF or wireless transceiver 1002A or 1002B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Embodiments of the various techniques described herein may be implemented in digital electronic circuitry, or in computer hardware, firmware, software, or in combinations of them. Embodiments may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Embodiments may also be provided on a computer readable medium or computer readable storage medium, which may be a non-transitory medium. Embodiments of the various techniques may also include embodiments provided via transitory signals or media, and/or programs and/or software embodiments that are downloadable via the Internet or other network(s), either wired networks and/or wireless networks. In addition, embodiments may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, embodiments of the various techniques described herein may use a cyber-physical system (CPS) (a system of collaborating computational elements controlling physical entities). CPS may enable the embodiment and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various embodiments of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments may be implemented in a computing system that includes a back-end component, e.g., as a data server, or that includes a middleware component, e.g., an application server, or that includes a front-end component, e.g., a client computer having a graphical user interface or a Web browser through which a user can interact with an embodiment, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described embodiments have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. An apparatus comprising:
   at least one processor; and
   at least one memory including computer program code;
   the at least one memory and the computer program code configured to, with the at least one processor, cause the apparatus to:
   send, to a base station, timing information including at least one of a beam switch timing or a beam report timing, wherein the timing information includes timing information provided for at least one of a first mode of operation or a second mode of operation, wherein the first mode of operation comprising the apparatus not performing switching between an active antenna panel and an inactive antenna panel of a plurality of antenna panels, and the second mode of operation comprising the apparatus performing switching between an active antenna panel and an inactive panel of the plurality of antenna panels; and
   receive, from the base station, at least one downlink control information indicating a mode of operation for the apparatus, wherein the indicated mode of operation is at least one of the first mode of operation or the second mode of operation.

2. The apparatus of claim 1, wherein antenna panel activation is not required for the first mode of operation, and antenna panel activation is required for the second mode of operation.

3. The apparatus of claim 1, wherein the at least one memory and the computer program code configured to, with the at least one processor, cause the apparatus to perform: at least one of transmitting a signal or receiving a signal based on the indicated mode of operation.

4. The apparatus of claim 3, wherein the performing comprises the at least one memory and the computer program code configured to, with the at least one processor, cause the apparatus to, if the indicated mode of operation is the first mode of operation:
   receive the at least one downlink control information using an active antenna panel of the plurality of antenna panels; and
   receive at least one channel state information reference signal using the active antenna panel, without switching to an inactive antenna panel.

5. The apparatus of claim 3, wherein the performing comprises the at least one memory and the computer program code configured to, with the at least one processor, cause the apparatus to, if the indicated mode of operation is the second mode of operation:
   receive the at least one downlink control information using a first antenna panel of the plurality of antenna panels, wherein the first antenna panel is an active antenna panel, and a second antenna panel is an inactive antenna panel;
   switch from the first antenna panel to the second antenna panel of the plurality of antenna panels;
   receive at least one channel state information reference signal using the second antenna panel of the plurality of antenna panels.

6. The apparatus of claim 5, wherein the switching from the first antenna panel to the second antenna panel comprises the at least one memory and the computer program code configured to, with the at least one processor, cause the apparatus to activate the second antenna panel.

7. The apparatus of claim 3, wherein the performing comprises the at least one memory and the computer program code configured to, with the at least one processor, cause the apparatus to, if the indicated mode of operation is the first mode of operation:
   receive at least one channel state information reference signal using an active antenna panel of the plurality of antenna panels; and
   transmit at least one channel state information report to the base station using the active antenna panel, without switching to an inactive antenna panel.

8. The apparatus of claim 3, wherein the performing comprises the at least one memory and the computer program code configured to, with the at least one processor, cause the apparatus to, if the indicated mode of operation is the second mode of operation:
   receive at least one channel state information reference signal using a first antenna panel of the plurality of antenna panels, wherein the first antenna panel is an active antenna panel, and a second antenna panel is an inactive antenna panel;
   switch from the first antenna panel to the second antenna panel of the plurality of antenna panels; and
   transmit at least one channel state information report to the base station using the second antenna panel.

9. The apparatus of claim 1, wherein the timing information includes at least one of the beam switch timing or the beam report timing for both of the first mode of operation and the second mode of operation.

10. The apparatus of claim 1, wherein the beam switch timing comprises a latency between receiving the at least one downlink control information and receiving at least one channel state information reference signal.

11. The apparatus of claim 1, wherein the beam report timing comprises a latency between receiving at least one channel state information reference signal and transmitting at least one channel state information report to the base station.

12. The apparatus of claim 1, wherein the at least one downlink control information includes an instruction indicating the mode of operation for the apparatus as either the first mode of operation or the second mode of operation.

13. The apparatus of claim 1, wherein the at least one downlink control information includes a scheduling offset for at least one channel state information reference signal or at least one channel state information report, wherein the mode of operation for the apparatus is based on the scheduling offset.

14. The apparatus of claim 1, wherein the received at least one downlink control information includes a first scheduling offset for receiving at least one channel state information reference signal with respect to the received at least one downlink control information; the at least one memory and the computer program code configured to, with the at least one processor, cause the apparatus to:
   determine whether the first scheduling offset is greater than or equal to the beam switch timing for the apparatus for the second mode of operation;
   determine that the first scheduling offset indicates the first mode of operation, for receiving the at least one downlink control information and receiving at least one channel state information reference signal, if the first scheduling offset is not greater than or equal to the beam switch timing for the apparatus for the second mode of operation; and determine that the first scheduling offset indicates the second mode of operation, for receiving the at least one downlink control information and receiving the at least one channel state information reference signal, if the first scheduling offset is greater than or equal to the beam switch timing for the apparatus for the second mode of operation.

15. The apparatus of claim 1, wherein the received at least one downlink control information includes a second scheduling offset for transmitting of at least one channel state information report with respect to receiving of at least one channel state information reference signal; the at least one memory and the computer program code configured to, with the at least one processor, cause the apparatus to:

determine whether the second scheduling offset is greater than or equal to the beam report timing for the apparatus for the second mode of operation;

determine that the second scheduling offset indicates the first mode of operation for the receiving of the at least one channel state information reference signal and the transmitting of the at least one channel state information report if the second scheduling offset is not greater than or equal to the beam report timing for the apparatus for the second mode of operation; and determine that the second scheduling offset indicates the second mode of operation for the receiving of the at least one channel state information reference signal and the transmitting of the at least one channel state information report if the second scheduling offset is greater than or equal to the beam report timing for the apparatus for the second mode of operation.

16. The apparatus of claim 1, wherein the beam switch timing for the first mode of operation comprises a minimum latency between receiving the at least one downlink control information using an active antenna panel and a first beam, and receiving at least one channel state information reference signal using the active antenna panel and a second beam, without switching to an inactive antenna panel.

17. The apparatus of claim 1, wherein the timing information includes a switch timing that indicates, for the apparatus, a latency between receiving the at least one downlink control information and transmitting at least one sounding reference signal for the at least one of the first mode of operation or the second mode of operation; and the at least one memory and the computer program code configured to, with the at least one processor, cause the apparatus to receive the at least one downlink control information and transmitting the at least one sounding reference signal based on the indicated mode of operation.

18. The apparatus of claim 17, wherein the receiving the at least one downlink control information and transmitting the at least one sounding reference signal comprises the at least one memory and the computer program code configured to, with the at least one processor, cause the apparatus to, if the indicated mode of operation is the second mode of operation:

receive the at least one downlink control information using a first antenna panel of the plurality of antenna panels, wherein the first antenna panel is an active antenna panel, and a second antenna panel is an inactive antenna panel;

switch from the first antenna panel to the second antenna panel of the plurality of antenna panels;

transmit the at least one sounding reference signal using the second antenna panel of the plurality of antenna panels.

19. An apparatus comprising:

at least one processor; and at least one memory including computer program code;

the at least one memory and the computer program code configured to, with the at least one processor, cause the apparatus to:

receive, from a user equipment that includes a plurality of antenna panels, timing information including at least one of a beam switch timing or a beam report timing, wherein the timing information includes timing information provided for at least one of a first mode of operation or a second mode of operation, wherein the first mode of operation comprising no switching between an active antenna panel and an inactive antenna panel of the plurality of antenna panels at the user equipment, and the second mode of operation comprising switching between an active antenna panel and an inactive antenna panel of the plurality of antenna panels at the user equipment;

select a mode of operation for the user equipment as the first mode of operation or the second mode of operation; and send, to the user equipment, at least one downlink control information indicating the selected mode of operation for the user equipment.

20. A method comprising:

sending, by a user equipment that includes a plurality of antenna panels, to a base station, timing information including at least one of a beam switch timing or a beam report timing, wherein the timing information includes timing information provided for at least one of a first mode of operation or a second mode of operation, wherein the first mode of operation comprising the user equipment not performing switching between an active antenna panel and an inactive antenna panel of the plurality of antenna panels, and the second mode of operation comprising the user equipment performing switching between an active antenna panel and an inactive panel of the plurality of antenna panels; and receiving, by the user equipment from the base station, at least one downlink control information indicating a mode of operation for the user equipment, wherein the indicated mode of operation is at least one of the first mode of operation or the second mode of operation.

* * * * *